United States Patent [19]

Nagoshi

[11] 4,273,441
[45] Jun. 16, 1981

[54] ELECTROPHOTOGRAPHIC COPYING APPARATUS

[75] Inventor: Mitsuru Nagoshi, Hachioji, Japan

[73] Assignee: Konishiroku Photo Industry Co. Ltd., Tokyo, Japan

[21] Appl. No.: 76,071

[22] Filed: Sep. 17, 1979

[30] Foreign Application Priority Data

Sep. 19, 1978 [JP] Japan .................. 53-114064

[51] Int. Cl.³ ............................................. G03B 27/54
[52] U.S. Cl. ........................................ 355/67; 362/16; 362/347
[58] Field of Search ......................... 355/67–71; 350/288, 293; 362/347, 16; 65/86

[56] References Cited

U.S. PATENT DOCUMENTS

| | | | |
|---|---|---|---|
| 3,368,071 | 2/1968 | Bentzman | 355/67 X |
| 3,535,035 | 10/1970 | Goodman | 355/67 X |
| 3,592,544 | 7/1971 | Brendel | 355/70 |
| 4,072,417 | 2/1978 | Motomura | 355/67 |

Primary Examiner—Richard A. Wintercorn
Attorney, Agent, or Firm—Bierman & Bierman

[57] ABSTRACT

An electrophotographic copier is provided with a reciprocable copy board. An illuminating lamp is located between a pair of spaced frame members which have rails for guiding the copy board. An improved reflector for directing light from the lamp toward the copy board is formed as a single, unitary structure including a rearwardly-extending ledge directly and rigidly supporting the lamp on the ledge at a fixed, predetermined position and orientation with respect to the reflector such that relative adjustments between lamp and reflector are eliminated.

7 Claims, 4 Drawing Figures

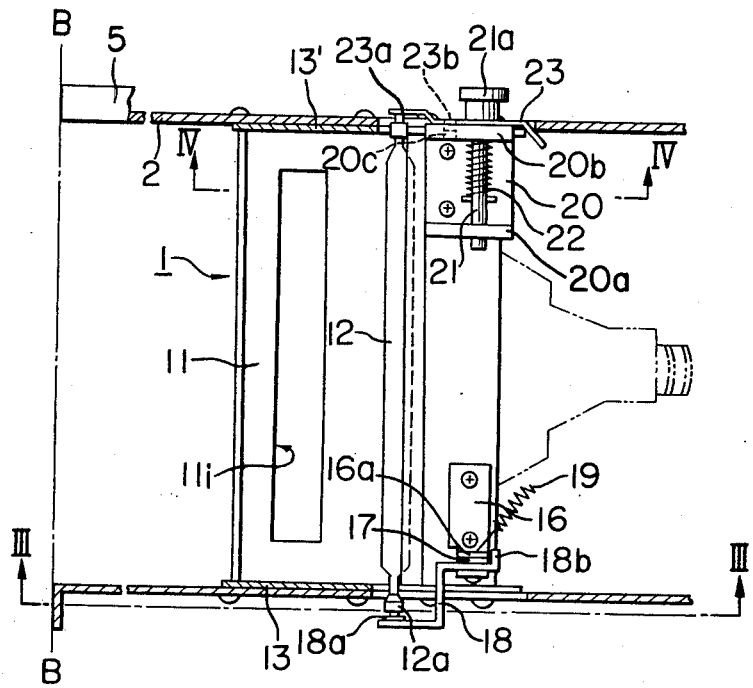
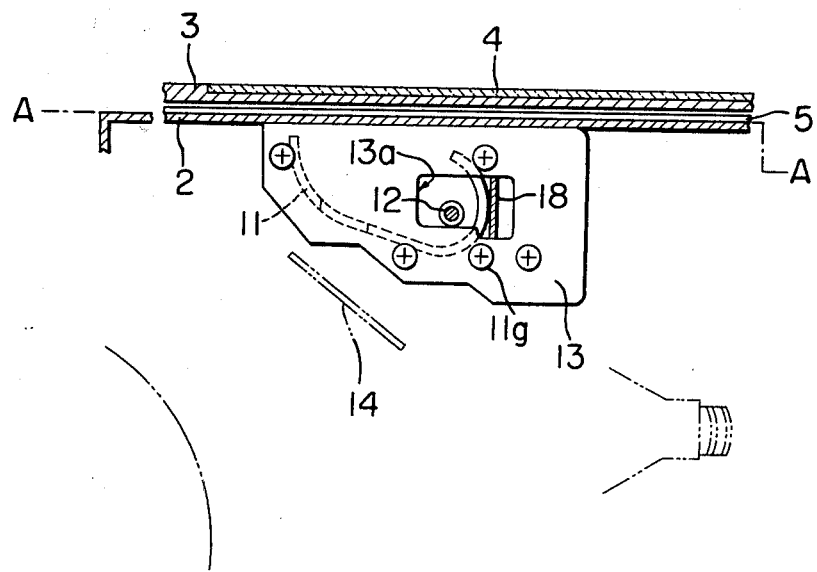

ELECTROPHOTOGRAPHIC COPYING APPARATUS

BACKGROUND OF THE INVENTION

1. Field of the Invention

The present invention relates in general to an electrophotographic copying apparatus of a movable copy board type, and more particularly concerns a structure and application of a reflector mirror which serves to direct light rays emitted from an original illuminating lamp upon energization thereof in a predetermined direction.

2. Description of the Prior Art

In the prior art electrophotographic copying apparatus or machine, the reflecting mirror is used only for directing the light ray emitted from the illuminating lamp toward a location on a path along which the copy board is moved and mounted to side frames of the copying machines at an appropriate position in combination with other members or components. The use of the reflector mirror for the other purposes has not been conceived. For mounting the reflector mirror on the machine frame, portions of the frames are bent inwardly with through holes being formed in the bent portions. On the other hand, either through-holes or threaded holes, in the case of which the thickness of the reflector is thick, are formed in the reflector mirror at appropriate locations, whereby the reflector mirror is fixedly secured to the frames through screw connections. Since the frames are usually formed with notches and large holes for mounting various parts thereon, there are necessarily produced in the frames mechanically strong and feeble portions. If the copying machine is assembled without paying any special consideration to the portions of a poor mechanical strength, a parallel arrangement of both frames which have to be disposed with a substantially uniform distance therebetween would be disturbed under unbalanced load, giving rise to a danger that the apparatus could not properly be operated (e.g. a stable running operation of the copy board may not be attained). With a view to evading such difficulties, a large number of supporting members are used for maintaining the structural integrity of the machine frames or alternatively the frames are made of heavy and thick members, which however requires troublesome procedures for assembling the machine frames and hence the copying machine. Of course, the bent portions described above may be utilized for the reinforcing purpose. However, the size of such bent portions provided in the frames of the copying apparatus is considerably small as compared with the dimension of the frames. Thus, the bent portions are not in the position to be used for reinforcement in like manner with the inherent supporting members. Further, the use of heavy or thick members for the frames to accommodate reduced mechanical strength is disadvantageous in that the weight of the whole apparatus is correspondingly increased. With the hitherto known structure of the copying apparatus, there arises in addition to the problems discussed above a difficulty that the positional relationships between the copy board and other members to be mounted on the frame, more particularly the illuminating apparatus, cannot be controlled with a desired accuracy in a facilitated manner. By way of example, a process of determining the mounting positions for various members to be mounted on the frames and machining the latter correspondingly will be described below.

Heretofore, provision of the threaded holes, notches and through-holes in the frames for mounting requisite members thereon has been effected usually in the following manner. In the first place, a flat plate cut in a proper size is positioned on a ruler plate along one side in an upstanding state, wherein a line is ruled at a predetermined portion to be processed or machined with one side in contact with the ruler plate and one of the sides extending perpendicularly to the former being used as a positional reference. Subsequently, the ruled portion is correspondingly machined. Thereafter, the bent portion is formed along the ruled line to install the rails for supporting and guiding the copy board. In the meantime, it is assumed that the positions of the other units such as the drum shaft supporting position, the developing device installing position or the like have been indexed properly. In forming the bent portions, it is very difficult to obtain them as precisely as the ruled line indicates. In reality, the provision of the bent portion is only possible with error which is significantly great as compared with the error involved in the formation of a hole. More particularly, the distance to the provided bent portion from the reference position (i.e. the reference side brought in contact with the ruler plate at the ruling step) will become different from one frame to the other. Further, distances between the paired bent portions will become different when the finished frames are disposed in opposition to each other. Consequently, when the copy board is rested on the rails installed on the bent portions having remarkable positional errors, the prescribed positional relationship can not be established between the copy board and the illuminating apparatus even if the latter is located at the proper position. More specifically, even when the positions of the reflector and the lamp disposed in front of the reflector are correctly established relative to a reference position, the distances between the end portions of the illuminating lamp and a light collecting portion for collecting light rays emitted from the lamp upon energization thereof (which is located at a predetermined position on the moving path of the copy board) will become deviated from the proper one, which eventually means that the optical path extending from an elongated illuminating lamp through a known optical system including a lens to a light-sensitive surface of a drum becomes different at both end portions of the lamp.

The problems discussed above are inherently ascribable to the machining process for fabricating the machine frames provided with projections or bent portions. Assuming that the bent portions for securing the rails thereon are formed correctly along the respective ruled lines, an step is still indispensably required in the structure in which the reflector is secured at small size bent portions projecting from the frames, while the illuminating lamp is held by holders mounted on the frames in an electrically insulated manner, because different reference positions are adopted for mounting the reflector and the illuminating lamp.

SUMMARY OF THE INVENTION

Accordingly, the present invention contemplates to eliminate or solve the difficulties or problems described above.

Before entering into a description of the preferred embodiment of the invention, the machining process as well as precision as attained will be briefly reviewed. In the first place, a plate-like blank material of a predetermined size for a frame constituting a part of the main body of a copying apparatus is prepared and positioned on a ruler plate in an upstanding or erected state. A line is ruled at a predetermined portion of the plate-like material with one side thereof contacted to the ruler plate being used as a provisional reference plane. Next, the plate material is bent along the ruled line to thereby form a bent portion of projection to install thereon the rail. A required number of the bent portions, are formed in a similar manner. Thereafter, the plate is reoriented on the ruler plate so that the outer surfaces of the bent portions on which the rail is to be mounted are brought in contact with the ruler plate in the upstanding state of the plate-like material. Subsequently, various portions for mounting requisite members are ruled and machined correspondingly. Thus, it will be appreciated that the true reference planes used in the present machining process are constituted by the outer surface of the bent portion destined to mount thereon the rail and one of the sides extending perpendicularly to the outer surface of the bent portion. The machining process described just above brings about advantages over the ones described hereinbefore in that a desired positional relationship between the copy board supported on the rails mounted on the outer surface of the bent portions serving as one reference plane and the members mounted on the machine frames having the bent portions formed therein can be established with high accuracy in a facilitated manner. Such proper positional relationship can be assured even when the frames provided with the predetermined members are mounted on a bottom plate of the copying machine. Consequently, the problem which remains to be solved is only the proper positioning of the illuminating lamp to the reflector with a desired accuracy in a facilitated manner without requiring any adjusting manipulations.

To this end, there is proposed according to a general feature of the invention that a reflector member is mounted on the lateral side frames with both ends of the reflector being essentially in contact with the frames, thereby to allow the reflector member to serve as the reinforcing member in addition to the inherent reflecting function. According to another aspect of the invention, it is also proposed that a reference plane for positioning or mounting the illuminating lamp is constituted by a portion formed integrally with the reflector so that the position of the illuminating lamp relative to the reflector (or relative to the moving path of the copy board in terms of the quality of the reproduced image) can be set with a high precision in a simple manner. In the following, the present invention will be described in detail by referring to the accompanying drawings which show a preferred embodiment of the invention only by way of example.

BRIEF DESCRIPTION OF THE DRAWINGS

FIG. 1 is a plan view showing an illuminating apparatus for an electrophotographic copying apparatus according to an embodiment of the invention in combination with other associated parts, FIG. 3 is a side view of the illuminating apparatus taken along the line III—III in FIG. 1.

DETAILED DESCRIPTION OF THE PREFERRED EMBODIMENT

Figure 2:
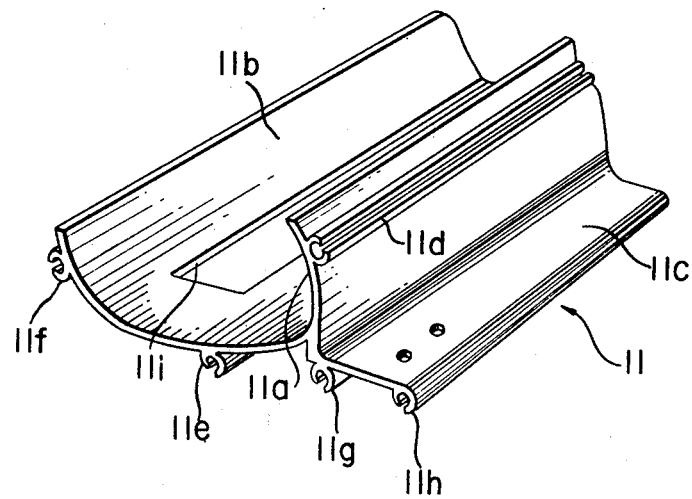
FIG. 2 is a perspective view showing a reflector unit constituting a part of the illuminating apparatus.
Figure 4:
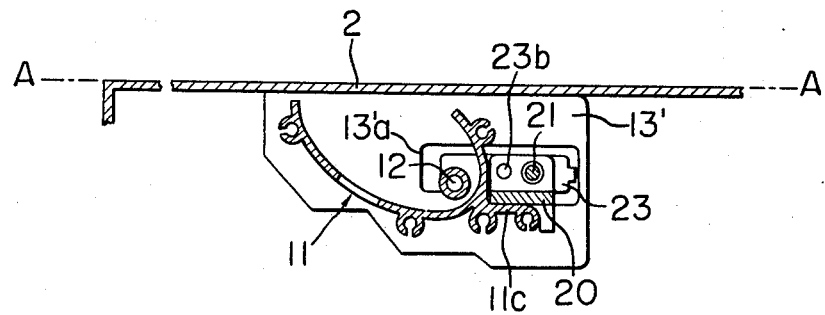
FIG. 4 is a fragmental side view taken along the line IV—IV in FIG. 1.

Referring to FIGS. 1 to 4, the illuminating apparatus denoted generally by reference numeral 1 is composed of a main and auxiliary reflector assembly 11 including a main reflector mirror portion 11a and an auxiliary reflector mirror portion 11b formed integrally with each other through a drawing or extrusion process, an illuminating lamp 12 adapted to be disposed at a predetermined position inwardly of the curved reflecting surface of the main reflector mirror portion 11a of the main and auxiliary reflector assembly 11, and a pair of side reflector mirrors 13 and 13' which are disposed at both sides of the main and auxiliary reflector assembly 11 and the illuminating lamp 12. The main and auxiliary reflector assembly 11 and the side reflectors 13 and 13' constitute a reflector unit, when assembled together. A predetermined number of mounting holes (inclusive of threaded holes) are formed in the side reflector mirrors in positional alignment with mounting holes (inclusive of threaded holes) provided in the main and auxiliary reflector assembly, as will be described hereinafter. Some of the mounting holes are constituted by unthreaded holes so as to allow the main and auxiliary reflector assembly to be mounted on machine frames.

Referring to FIG. 2 which shows the main and auxiliary reflector assembly 11, the main reflector mirror portion 11a includes an ellipsoidal reflecting surface consisting of a combination of ellipsoidal sections arranged in view of attaining a high light collecting efficiency. A lamp fixture portion 11c which is to serve as a reference for mounting the illuminating lamp is provided at a side of the main reflector mirror portion 11a in opposition to the auxiliary reflector mirror portion 11b. It will be seen that mounting holes 11d, 11e, 11f, 11g and 11h are formed in the main reflector mirror portion 11a, the auxiliary reflector mirror portion 11b and the lamp fixture portion 11c for mounting fixedly the reflecting mirror unit to the frames. On the other hand, the auxiliary reflector mirror portion 11b has also a curved reflecting surface designed in consideration of the light collecting efficiency to be attained. A window 11i is formed intermediate the main reflector mirror portion 11a and the auxiliary reflector mirror portion 11b and serves to pass therethrough light rays reflected from an original to be copied toward a mirror 14 of an optical system disposed below the illuminating apparatus (refer to FIG. 3). Each of the side reflectors 13 and 13' is constituted by a flat mirror member having a reflecting surface only at one side and formed with respective openings 13a, 13a', as can be seen from FIGS. 3 and 4. The illuminating lamp 12 may be constituted by a known halogen lamp provided with means for uniform light emission characteristics.

Prior to the mounting of the illuminating apparatus according to the invention on the main body of a copying machine, the illuminating lamp is first installed in the reflecting unit. At the beginning of the assembling procedure, the main and auxiliary reflector mirror assembly 11 is secured to the paired side reflecting members 13 and 13' by means of set screws inserted through the associated mounting holes 11e, 11f and 11h. Subsequently, a metallic mounting plate 16 having an erecting or upstanding piece 16a formed at one end is fixedly secured to the lamp fixture portion 11c in the vicinity of one end through screws. A bent arm 18 for supporting the lamp 12 is horizontally mounted on the upstanding section 16a. The bent arm 18 is made of an electrically conductive material and is electrically insulated from the mounting plate 16 by member 17 coated with an electrically insulating material such as polybutylene terephthalate. A projection 18a adapted to be brought in contact with a terminal 12a of the lamp 12 is formed at one end of the arm 18, while the other end thereof is provided with a terminal 18b connected to a lead wire 19. It will be noted that the arm 18 provides a current supply path leading to one electrode of the lamp 12. Secured fixedly by means of screws to the lamp fixture portion 11c near the other end thereof is another mounting plate 20 having upstanding pieces 20a and 20b at both ends thereof. A pin 21 having an enlarged head 21a is inserted loosely through the holes formed on the upstanding pieces 20a and 20b from the outer side of the side reflector member 13'. A compression spring 22 is disposed around the pin 21 between an annular spring sheet or E ring mounted at an intermediate portion of the pin 21 and the upstanding piece 20b, to thereby urge constantly the pin 21 inwardly. Mounted fixedly adjacent to the enlarged head 21a of the pin 21 is an arm 23 having one end portion which is bent so as to project inwardly through the opening 13a' (refer to FIG. 4) formed in the side reflector member 13' and is connected to a lead wire (not shown) as with the portion 18b, while the other end portion of the arm 23 is provided with a projection 23a adapted to be brought in contact with a terminal 12b of the illuminating lamp 12. Further, a pin 23b is anchored to the arm 23 at a substantially center portion thereof and engaged in a recess 20c formed in the outer side of the upstanding piece 20b of the mounting plate 20.

For installing the illuminating lamp 12 to the reflector unit thus assembled, the pin 21 is pulled outwardly and rotated slightly to the left or right, to thereby incline the arm 23 slightly from the horizontal position. Subsequently, the illuminating lamp 12 is inserted through the opening 13'a from the outer side of the side reflector member 13', whereby one terminal 12a of the lamp 12 is caused to engage with the projection 18a formed in the bent arm 18 at one end thereof. Thereafter, the arm 23 is restored to the horizontal position to cause the projection 23a formed at one end thereof to engage with the other terminal 12b of the lamp 12. Because the pin 21 is constantly urged inwardly under the influence of the spring 22, the illuminating lamp 12 will be pressed inwardly by the projection 23a bearing against the terminal 12b of the lamp 12, whereby the lamp 12 is held between the arm 18 and 23 under a slight pressure. The mounting position of the illuminating lamp 12 relative to the ellipsoidal reflecting surface of the main and auxiliary reflector assembly 11 is predetermined so as to attain the highest light collecting efficiency. In practice, the predetermined position of the illuminating lamp 12 can be indexed with a high accuracy by the mounting positions of the mounting plates 16 and 20 to the lamp fixture portion 11c as well as the mounting positions of the arms 18 and 23 to the mounting plates 16 and 20 and the lengths of the arms. In this manner, the illuminating lamp 12 can be mounted at a preset position with reference to the lamp fixture portion 11c; i.e. at the position corresponding to the first focal point of the ellipsoidal reflector surface.

For mounting the illuminating apparatus thus assembled onto a machine frame 2 of the copying apparatus, the mounting holes formed in the side reflector members 13 and 13' in correspondence to the mounting holes 11d and 11g formed in the main and auxiliary reflector assembly 11 are positioned in alignment with the mounting holes formed in the side wall of the machine frame 2 at predetermined positions with the top plane A—A of the machine frame 2 (refer to FIGS. 3 and 4) being used as the reference position for mounting. The positioning of mounting members relative to the machine frame (inclusive of the indexing of the reference plane described above) may be effected through the last mentioned one of the two processes described hereinbefore. Thus, further description will be unnecessary.

The main and auxiliary reflector assembly 11 of the integrally molded structure which is mounted as being suspended between the side frames 2 of the copying machine is mechanically reinforced. An end plane B—B (refer to FIG. 1) of the machine frame 2 is used as the reference position for positioning the illuminating apparatus in the horizontal orientation. In this manner, the illuminating apparatus 1 is mounted on the main body of the copying machine relative to the reference positions provided by the planes A—A and B—B.

On the other hand, rails 5 for guiding the copy board 3 which supports an original to be copied are mounted to a top of the machine frame 2 with reference to the A—A plane so that the light rays from the reflector unit may be collected at a top surface of the glass plate 4.

By virtue of the fact that both the illuminating apparatus and the copy board are mounted with reference to the same reference plane A—A, no adjustment of the relative position between the illuminating apparatus and the copy board is required, whereby the otherwise required fine adjusting mechanism as well as time consumption involved in the adjustment and troublesome procedure can be completely spared. Further, because the relative position between the illuminating apparatus 1 and the copy board 3 is definitely determined, the original to be copied can be illuminated with a high light collecting efficiency, allowing a copy to be reproduced with an improved image quality.

In the foregoing description, it has been assumed that the main and auxiliary reflector assembly is of an integral structure formed through drawing or extrusion. However, the invention is not restricted to such structure. The main reflector mirror portion 11a may be made separately from the auxiliary reflector mirror portion 11b and connected together with the latter.

What we claim is:

1. In an electrophotographic copying apparatus including a pair of spaced frame members having rails mounted thereon for guiding a reciprocatable copy board supporting an original to be copied, an illuminating lamp located between the pair of frame members, and a reflector mirror of a predetermined configuration mounted in association with the illuminating lamp so as to direct light rays emitted by the illuminating lamp toward the copy board; the improvement comprising:

said reflector mirror being formed as a single, unitary structure and including a rearwardly-extending ledge directly and rigidly supporting the illuminating lamp on said ledge at a fixed, predetermined position and orientation with respect to the reflector mirror whereby the need for further relative adjustment therebetween is obviated.

2. In a copying apparatus according to claim 1, the reflector mirror and the rails for guiding the reciprocatable copy board being mounted on the copying apparatus in predetermined alignment with a common reference plane of the apparatus so as to insure a complete and common alignment between the copy board, the reflector mirror and the illuminating lamp for proper operation of the copying apparatus and thereby obviate the need for further alignment-effecting adjustment therebetween.

3. In a copying apparatus according to claim 1, a pair of side reflectors carried on oppositely-disposed ends of said reflector mirror in a fixed and predetermined orientation with respect thereto and comprising, in combination with said reflector mirror and said illuminating lamp, a reflector mirror assembly.

4. In a copying apparatus according to claim 3 wherein each said side reflector includes an opening defined therein,
a pair of arms, each said arm being carried on said ledge in predetermined alignment with respect to the reflector mirror and passing through the opening in a respective one of said side reflectors for supporting the illuminating lamp between said pair of arms such that a portion of said lamp extends through the opening in at least one of said side reflectors.

5. In a copying apparatus according to claim 4, said reflector mirror assembly having a length corresponding to the distance between the pair of frames and being mounted on and between said frames such that said reflector mirror assembly is effective to increase and reinforce the structural rigidity of the copying apparatus.

6. In a copying apparatus according to claim 5, said unitary reflector mirror being integrally formed through extrusion.

7. In a copying apparatus according to claim 3 or 4, each of said side reflectors including a relatively straight edge disposed in a fixed and predetermined orientation with respect to the reflector mirror such that when the reflector mirror assembly is mounted on the copying apparatus said edges are so positioned with respect to the copy board guide rails as to dispose the reflector mirror and the illuminating lamp and the copy board in common, relative alignment and thereby obviate the need for further alignment-effecting adjustment therebetween.

* * * * *